Nov. 3, 1925.
G. M. LUDLOW
1,559,573
TEMPERATURE COMPENSATOR FOR SPRING SCALES
Filed Dec. 3, 1921
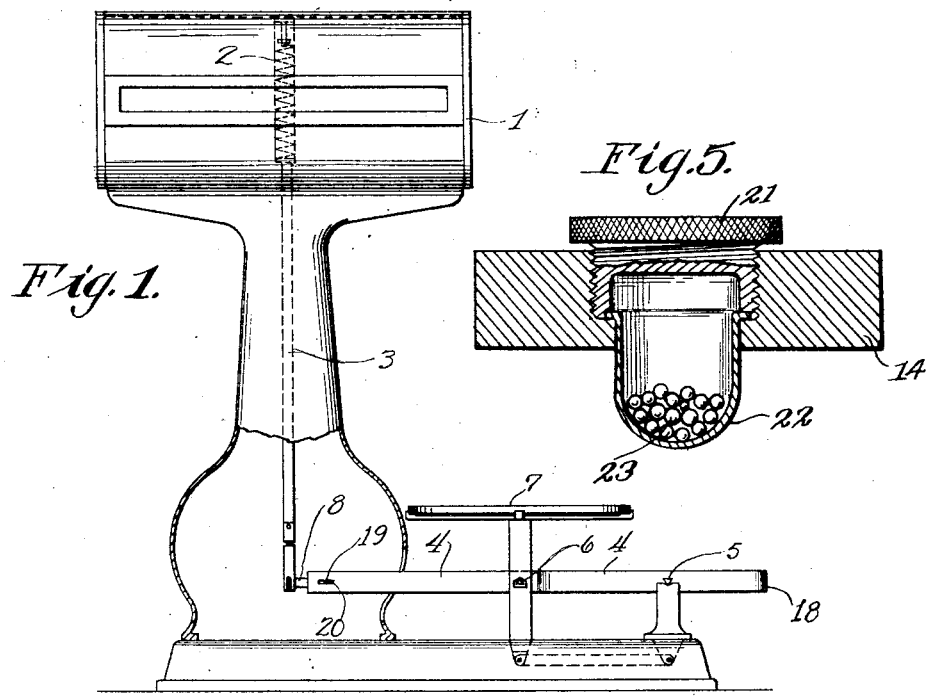
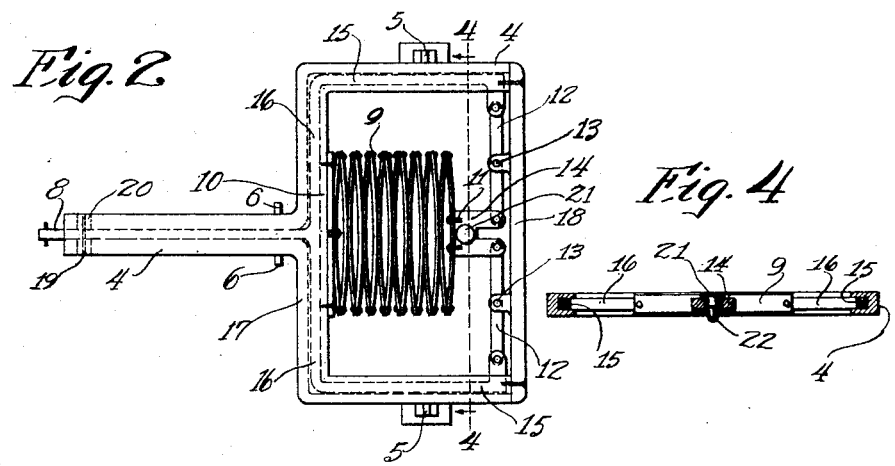
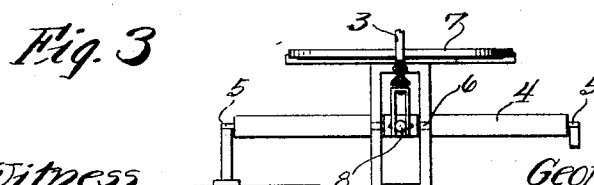
Witness
J. L. Brown
Inventor,
George M. Ludlow,
By Wilkinson, Huxley, Byron, & Knight
Attys.

Patented Nov. 3, 1925.

1,559,573

UNITED STATES PATENT OFFICE.

GEORGE M. LUDLOW, OF EVANSTON, ILLINOIS, ASSIGNOR TO SANITARY SCALE COMPANY, OF CHICAGO, ILLINOIS, A CORPORATION OF ILLINOIS.

TEMPERATURE COMPENSATOR FOR SPRING SCALES.

Application filed December 3, 1921. Serial No. 519,581.

*To all whom it may concern:*

Be it known that I, GEORGE M. LUDLOW, a citizen of the United States, residing at Evanston, in the county of Cook and State of Illinois, have invented certain new and useful Improvements in Temperature Compensators for Spring Scales, of which the following is a specification.

This invention relates to means for correcting the weighing effect of a spring balanced scale to compensate for changes in atmospheric temperature.

It has heretofore been proposed to thermostatically modify the leverage through which a load acts upon the spring balanced weighing mechanism of a scale for the purpose above stated, and in accomplishing this a thermostat has been mounted upon the weighing lever in a manner to transmit movements resulting from its expansion and contraction, directly to a longitudinally adjustable part of the lever, with the effect of shortening the leverage and increasing the load upon the spring when the temperature falls and the spring becomes stiffer, and lengthening the leverage to decrease the load when the spring becomes more yielding under a rise in temperature. But such an arrangement, while tending to correct the error of the scale due to change in temperature, involves the disadvantage of shifting the center of gravity of the weighing lever in the direction to aggravate the error with each length adjustment rather than correct it, and thus requires an excessive leverage adjustment besides affecting the absolute initial load of the lever.

The present invention has for its object to avoid the above mentioned disadvantage, and consists in combining a thermostatic device with a weighing lever in a manner to cause the thermostatic device to move in the same direction as the center of gravity of the lever, so that it assists directly in establishing said center of gravity, that is to say toward the lever fulcrum when it is necessary to decrease the initial load of the lever upon the spring, as the latter becomes more yielding under a rise in temperature and away from the fulcrum, to increase the initial load of the lever upon the spring, when the latter becomes more resistant under a drop in temperature; said thermostat being caused to develop such movements, directly with changes in the center of gravity, as distinguished from inversely thereto, in a suitable counter-poise which also moves directly with the thermostat and therefore with changes in center of gravity, which may exist simply in the structure of the thermostat itself or in some of its transmitting connections or be definitely provided in the form of a weight which the thermostat moves.

Inasmuch as changes in leverage are desirable in temperature compensation in scales, in addition to changes in center of gravity, the object of the present invention is best realized by having the thermostat, operating as aforesaid, also impart movement to the load-transmitting element at the free end of the lever, and in doing so the thermostat moves oppositely to the load-transmitting element; that is to say shifts the center of gravity toward the fulcrum as the load-transmitting element moves to extend the length of the lever or vice versa.

Another object of the invention is to provide an improved means whereby a thermostat operating in the manner described, and controlling a counter-poise as aforesaid, may impart movements to the load-transmitting element of the lever; and accordingly, another feature of the invention consists in connecting the reversely moving thermostat with the load-transmitting element, through motion reversing connections, preferably in the form of a pair of levers fulcrumed on the scale lever, and having each one end connected with the free end of the thermostat and its other end with a transmitting frame which is in turn connected with the load-transmitting element of the scale lever.

Still another object is to provide an improved form of counter-poise for a thermostat operating upon the principle herein described; and to this end another feature of the invention consists in providing a counter-balance which moves directly with the thermostat, with a variably rectifying means partaking of the movements of the counter-poise; a preferred embodiment of this part of the invention also including the feature of using the counter-poise as a means for connecting the thermostat with the direction-reversing levers.

In order that the invention may be fully understood, several embodiments thereof are illustrated in the accompanying drawings, in which—

Figure 1 is an elevation partly in section of a simple construction of scale of a type to which the invention is applicable.

Figure 2 is a top plan view of the weighing lever employed in Figure 1.

Figure 3 is a front elevation of the weighing lever and its appurtenant parts.

Figure 4 is a section on the line 4x—4x of Figure 2.

Figure 5 is a detail view of a shot cup employed in the embodiment of Figures 2 and 4.

1 represents the casing, 2 the counterbalancing spring, 3 the steelyard rod, and 4 the weighing lever of a known type of scale. Lever 4 is fulcrumed at 5, carries knife-edge supports 6 for loading tray 7, and has a longitudinally adjustable tongue 8 through which it connects with the steelyard rod 3. In arrangements of this kind, spring 2 is customarily adjusted so that under the initial load normally imposed by the lever 4 and the parts mounted upon it, a chart or indicator in the casing 1 will register with zero. The changes in temperature causing expansion and contraction to some extent in the loading lever, but manifesting itself to much greater extent in the counterbalancing spring 2, will throw the indicator off the zero mark. To remedy this defect it has heretofore been proposed to mount upon the lever 4 a thermostat of suitable construction, with one end of the thermostat fixedly anchored upon a rear portion of the lever and with its other end extending forwardly and directly connected to the tongue, thereby moving the tongue outward and inward with expansion and contraction of the thermostat due to changes in temperature, and changing the leverage of the load imposed upon the spring 2 in a manner to maintain the indicator chart at zero and change the reading of weight when an article is placed upon the tray 7. But with such a location of the fixed abutment of the thermostat 9 with relation to the tongue 8, the center of gravity of the lever, due to the extension and retraction of the thermostat and of the tongue, moves outwardly when the leverage increases, and inwardly as the leverage decreases. In other words, when the lever is lengthened to reduce the weighing effect on the spring that is rendered weaker by expansion, the load on said spring is simultaneously increased and to a certain extent neutralizes the lever adjustment, while with the retraction or inward movement of the tongue and thermostat, the center of gravity moves rearward and reduces the load imposed upon the spring at a time when the spring is contracted and rendered stiffer by a low temperature. The present invention affords a more rational employment of the thermostat.

According to the present invention, the thermostat is changed in its relation to the lever that carries it and the extension of the lever which it affects. This arrangement consists in locating the thermostat 9 with its fixed abutment at 10 or other equivalent position, and with its free end 11 presented rearwardly and there connected with reversing means which in turn convert its movements as imparted to the tongue 8, so that while the tongue still moves outward under an expansion of the thermostat and inward under a contraction of the same, the thermostat and some of its connected parts are moving in a direction opposite to that in which the tongue moves and the center of gravity of the weighing lever 4 may be made substantially constant in position. The reversing connection which I prefer to employ consists of a pair of levers 12 each provided with a fixed fulcrum 13 upon a rear portion of the lever 4, with one end of each reversing lever connected through the block 14 with the free end of the thermostat 9 and with the other ends of said levers connected, respectively, to the two arms 15 which extend first laterally as at 16 and then rearwardly, from the tongue 8. Connecting block 14 may be made as much of a factor as desired in determining the center of gravity of the lever 4. It will preferably be constructed with a rectifier 21 constructed with a cup 22 (Figure 5) to receive shot, in accurately determining the initial load of the lever.

For convenience in mounting the thermostat 9 and reversing levers 12, the rear end of the weighing lever 4 is developed into the form of a frame or box-like structure with the forward side 17 serving as the abutment for the thermostat 9, and the rear side 18 serving to mount the levers 12. The cross section of the several parts of the lever 4 will preferably be channelled in order to accommodate the tongue 8 and its extensions 15, 16, within the frame and provide a guide therefor, and the rear bar 18 of the lever will be made removable for convenience in assembling the parts. The forward end of the tongue 8 may, if desired, be sustained in the downwardly presented channel of the front end of lever 4 by means of a pin 19 extending through tongue 8 and a slot 20 in the scale lever.

I claim:

1. In combination with a weighing lever having an adjustable part moving longitudinally thereof for changing its leverage, a thermostat carried by said lever and expanding and contracting thereon in directions longitudinal of the lever, a connection between said thermostat and said part through which each movement of the thermostat is imparted to the adjustable part in reverse direction, and a counterbalance weight moved by the expansion and contraction of the thermostat, in the same directions therewith.

2. In combination with a scale lever a load transmitting member constructed for extension and retraction in the direction of its length, a thermostat carried by said lever and expanding and contracting longitudinally thereof under changes in temperature, in directions opposite to those required in the load-transmitting member, means receiving and reversing the movements imparted by said thermostat and transmitting them in reverse directions to the load transmitting member and a counter-balance weight moved directly by and in the same direction as the thermostat.

3. In combination with a weighing lever a load transmitting member constructed for longitudinal adjustment thereon, a thermostat carried by and fixed at one end upon a forward portion of said lever and with its other end presented toward the rear end of said lever free to move longitudinally thereof and carrying a counter-weight, and a reversing lever connecting the free end of said thermostat with said member and imparting longitudinal adjustment thereto opposite to those of the thermostat.

4. In combination with a scale lever having a load transmitting member constructed for longitudinal adjustment thereon, a thermostat fixed at one end upon said lever and having its other end free to move longitudinally thereof, a pair of reversing levers fulcrumed on said scale lever having each an end connected with the free end of the thermostat, and a transmitting frame connected with the other end of each reversing lever and imparting adjustments to the load transmitting member.

5. In combination with a weighing scale lever, a connecting tongue mounted with freedom of longitudinal movement thereon, and having rearwardly extending spaced arms, a thermostat having one end fixedly anchored to the scale lever and its other end presented rearwardly between said spaced arms with freedom of movement longitudinally of the scale lever under changes in temperature, and reversing levers fulcrumed upon a rear portion of the scale lever and each having one end connected with the free end of the thermostat and its other end connected with an arm of the tongue.

6. In a weighing lever, a load transmitting member adjustable thereon for influencing the length of said lever, a counterbalance member on the lever having adjustments opposite to those of the load transmitting member, and a variable rectifying means mounted upon the lever and partaking of adjusting movements of one of said members.

7. In combination with a weighing lever, a load transmitting member adjustable thereon, a counterpoise adjustable longitudinally of said lever oppositely to the movements of said member, a thermostat adapted to control the positions of said member and said counterpoise, and a rectifier mounted on said counterpoise.

Signed at Evanston, Illinois, this 1st day of December, 1921.

GEORGE M. LUDLOW.